Feb. 6, 1968  J. MacPHEE  3,367,840
NUCLEAR REACTOR FUEL BUNDLE
Original Filed Sept. 25, 1963  4 Sheets-Sheet 1

INVENTOR.
JOHN MAC PHEE
BY
Arthur J Plantamura
ATTORNEY.

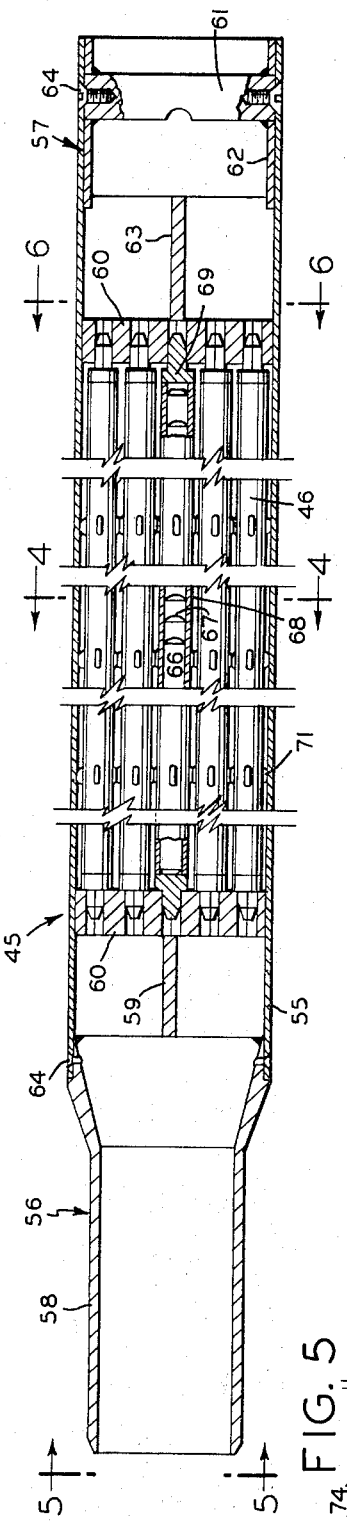
FIG. 3
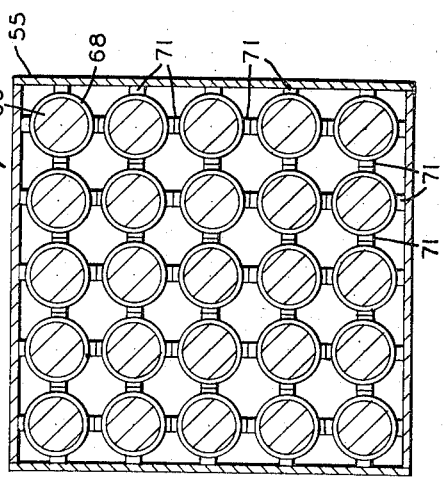
FIG. 4
FIG. 5
INVENTOR.
JOHN MAC PHEE
BY
Arthur J. Plantamura
ATTORNEY.

Feb. 6, 1968 J. MacPHEE 3,367,840
NUCLEAR REACTOR FUEL BUNDLE
Original Filed Sept. 25, 1963 4 Sheets-Sheet 4
FIG. 6
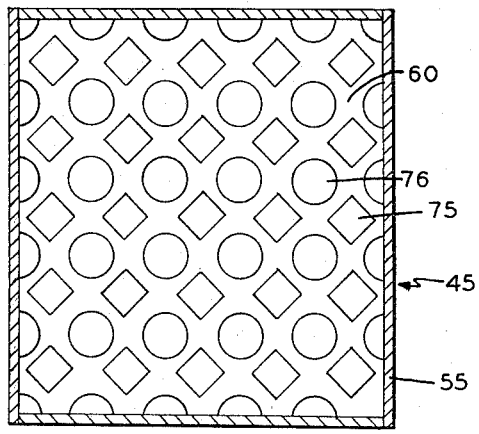
FIG. 7
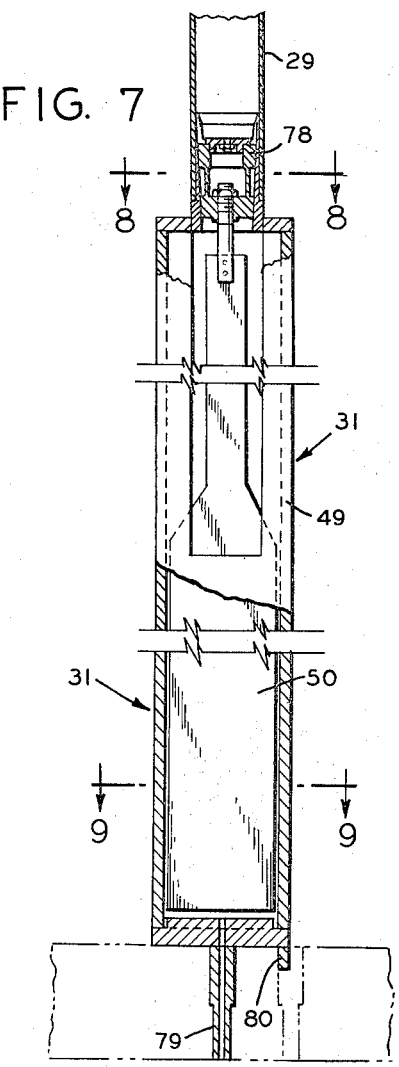
FIG. 8
FIG. 9
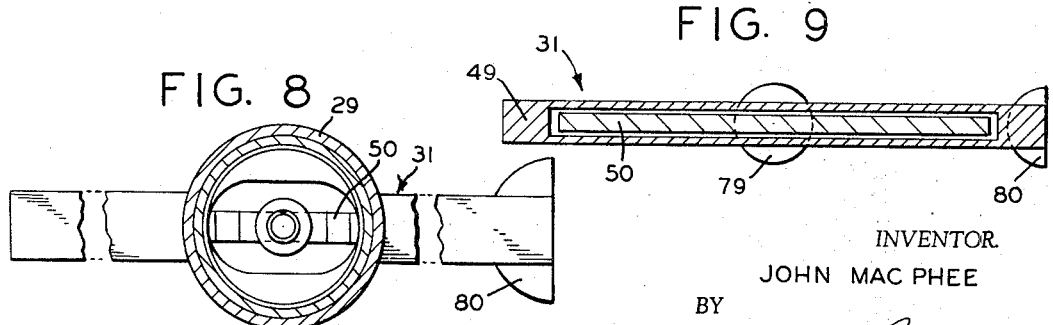
INVENTOR.
JOHN MAC PHEE
BY
Arthur J. Plantamura
ATTORNEY.

3,367,840
NUCLEAR REACTOR FUEL BUNDLE
John MacPhee, Rowayton, Conn., assignor to American Machine & Foundry Company, a corporation of New Jersey
Continuation of application Ser. No. 311,573, Sept. 25, 1963. This application June 3, 1966, Ser. No. 555,936
2 Claims. (Cl. 176—78)

ABSTRACT OF THE DISCLOSURE

The invention is concerned primarily with a fuel element system having a plurality of metallic clad elongated fuel pins, the pins being maintained in spaced relationship by spacing means which are fixed thereto and intermittently spaced along the length of the pins. Accordingly, when the fuel pins are interposed, the spacing means engage like spacing means on adjacent pins thereby lending support to the plurality of fuel pins. The pins are further provided with a metallic housing and an eccentric fitting in order to permit interchangeable mounting of an array of fuel pins in a grid plate. The eccentric fitting provides control rod channels between the fuel pins.

---

This application is a continuation of my copending application Ser. No. 311,573, filed Sept. 25, 1963, and now abandoned.

This invention relates to nuclear reactors categorized as research reactors and more specifically to research reactors of the swimming pool type.

It is a further object of the invention to provide a novel fuel element orientation for the nuclear reactor core assembly allowing for significantly improved flexibility and avoiding the need for special fuel assemblies normally required to house control rods in assemblies of this kind.

Additional objects and advantages will become apparent as the invention is described in greater detail in conjunction with the various figures of the drawing, wherein:

FIG. 3 is a side view partially in section of a single fuel assembly.

FIG. 4 is a transverse sectional view taken substantially along line 4—4 of FIG. 3.

FIG. 5 is a transverse view of the fuel assembly end fitting taken substantially along line 5—5 of FIG. 3.

FIG. 6 is a transverse sectional view taken substantially along line 6—6 of FIG. 3.

FIG. 7 is a side elevational view partially in section of a control rod assembly employed in conjunction with the reactor core of the invention.

FIG. 8 is a transverse view taken substantially along line 8—8 of FIG. 7 with the piston omitted.

FIG. 9 is another transverse view taken substantially along line 9—9 of FIG. 7.

The core of the reactor consists of fuel assemblies which are interchangeable with the familiar plate type aluminum-uranium alloy fuel assemblies used in the many pool type research reactors now in use and for this reason offers the additional advantage of permitting practical conversion of existing steady state research pool reactors. The present invention distinguishes over conventional pool research reactors in that it utilizes a novel fuel assembly, which comprises a plurality of uranium dioxide pin type fuel elements. These elements are held in spaced relationship in a container of suitable metal such as a zirconium or aluminum alloy box.

Figure 1:
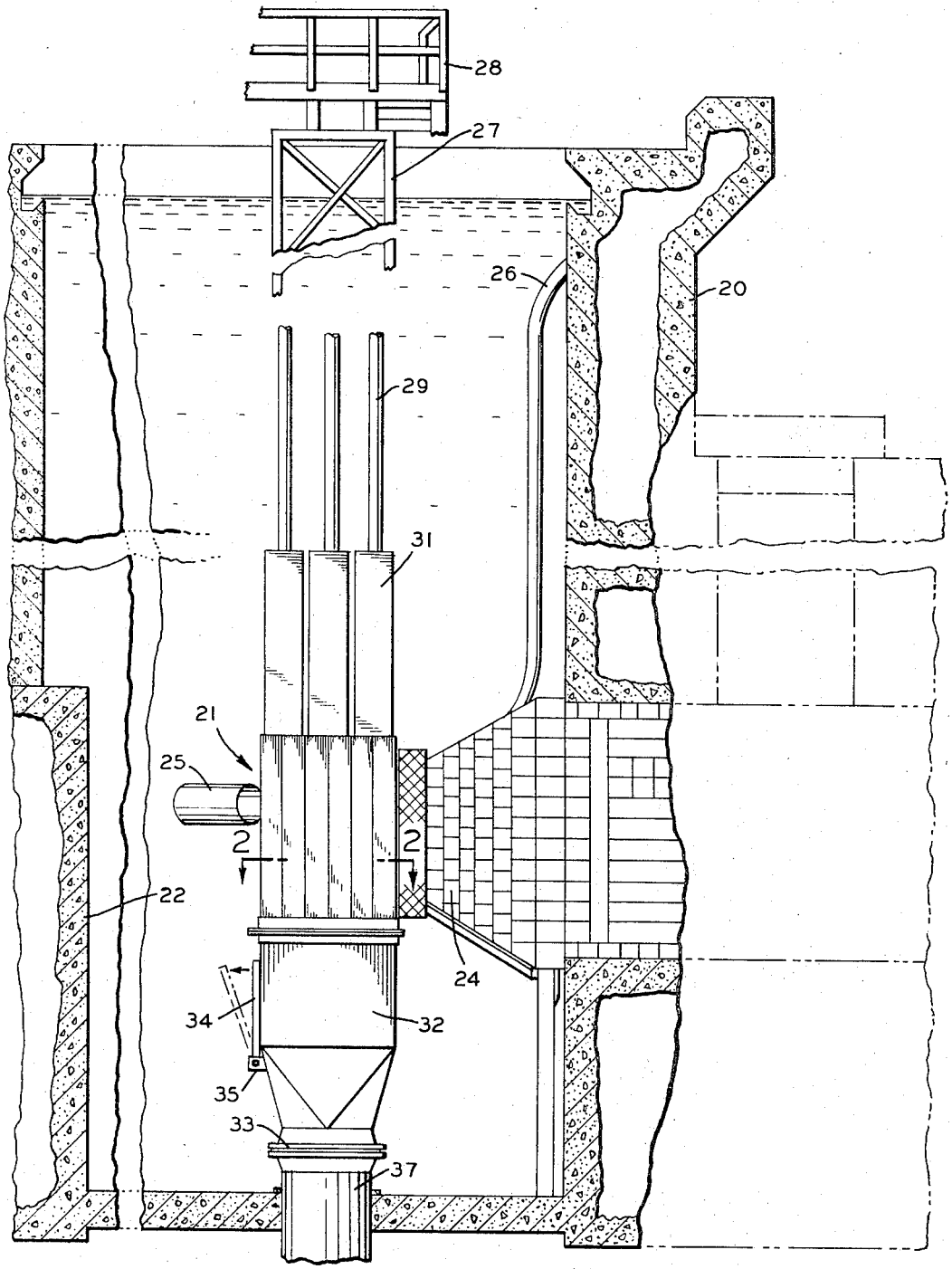
FIG. 1 is a schematic side elevational view illustrating schematically the core of the invention in relationship to various components of a conventional research reactor.

Prior to a detailed disclosure of the features of the core including fuel elements, cladding, control rods, etc., reference is generally made to the arrangement of FIG. 1 in which various appurtenant elements conventional to research reactors of the pool or tank type or illustrated.

The arrangement of FIG. 1 includes a pool enclosure 20 and a core 21 contained therein. The tank or pool walls 22 adjacent to the active core 21 are formed of relatively dense concrete of the type conventionally used for this purpose such as barytes concrete. A thermal column 24 of usual form generally comprising stacked graphite and lead shield functions as a neutron moderator to slow down fast neutrons for radiation experiments. Conventional beam tubes only one, 25, of which is illustrated radiate in horizontal direction from the reactive core. The beam tubes 25 comprise generally an aluminum liner and interior shielding blocks of canned high density concrete and lead. A pneumatic rabbet 26 comprising a concentric aluminum air line carries a sample carrier or rabbet into high neutron flux areas at the core. The facility may be equipped with suitable controls for varying the period of sample irradiation and for movement of the core to locations in the pool other than adjacent the thermal column 24.

A conventional reactor control instrument bridge 28 is suitably supported over the pool in any appropriate manner. Shown at 31 are control rods provided with extensions 29 leading to control rod actuators (not shown) on the bridge 28. Situated below the core 21 is a coolant plenum 32 leading to exhaust outlet 37 through a joint 33 which can be disconnected to permit movement of the core to the center of the pool rather than adjacent the thermal column.

A core of the kind contemplated by the invention is now described in conjunction with the more detailed figures of the drawing.

Figure 2:
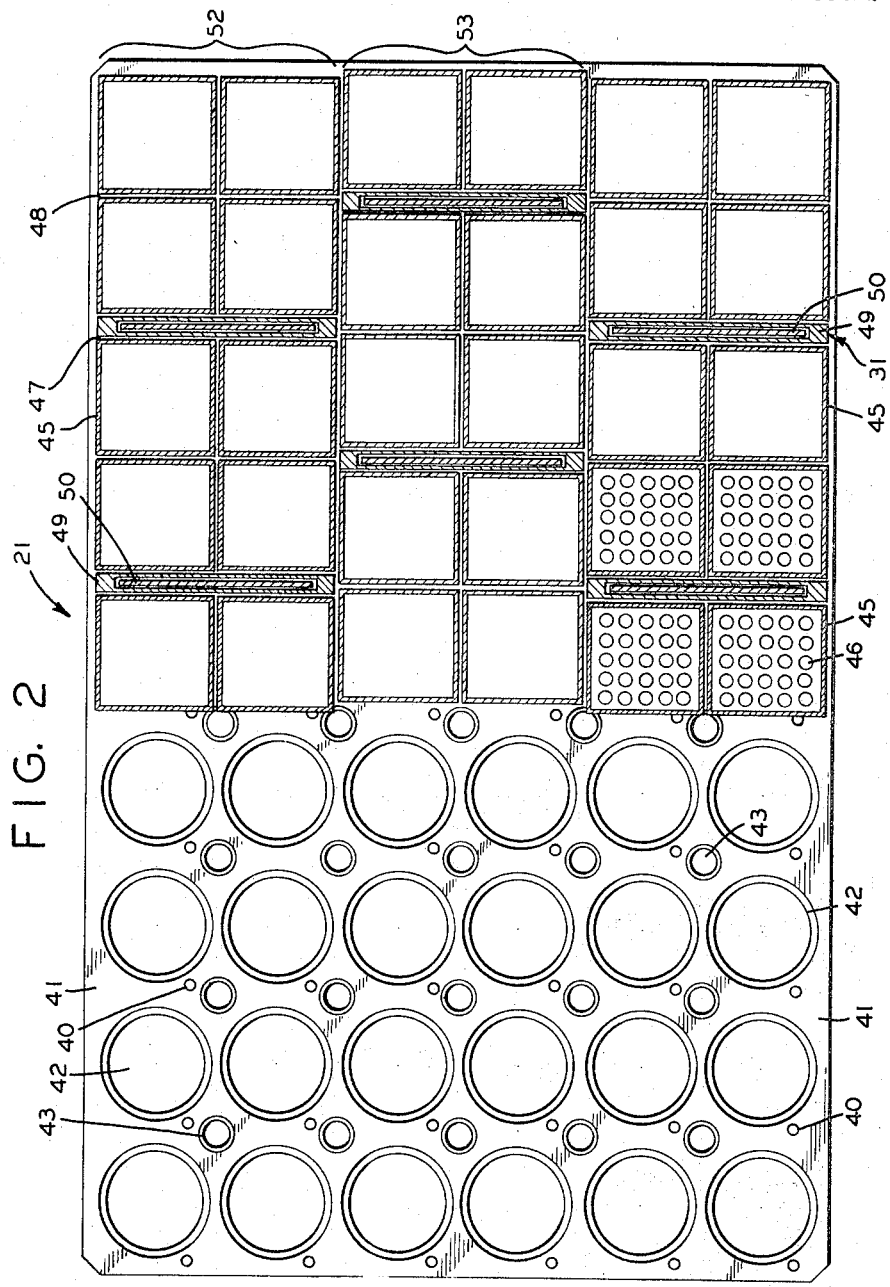
FIG. 2 is a transverse section of the core taken substantially along line 2—2 of FIG. 1 illustrating the fuel assemblies and control rod assemblies which comprise the core partially filling the grid plate.

FIG. 2 illustrates the core cross section comprising a grid plate 41 which is provided with a plurality of fuel assembly locating holes 42, coolant flow passage openings 43, and fuel assembly pins 40. The fuel assemblies which contain a plurality of fuel pins or elements 46 are designated 45. The grid plate 41 as illustrated is arranged to accommodate 54 fuel assemblies although this number is not critical. Contained in the grid plate 41 as shown in FIG. 2 are thirty fuel assemblies. The fuel assemblies are designed with appropriate eccentricity so that when suitably mounted they provide a plurality of wider channels designated 47 between every other row and narrower channels 48 between alternate rows. The wider channels are made to accommodate control rod assembly 31 which comprises a control rod guide 49 and a movable control rod 50. The fuel assemblies 45 are comprised of fuel elements or pins designated by 46.

Through the utilization of the fuel arrangement shown in FIGS. 2 through 5, a fuel assembly comprising a single construction may be used in the core of this invention, i.e. no special configurations in the fuel elements to adapt for the accommodation of control rods is necessary. Each of the fuel elements are interchangeable in position and may be shifted so that the space for the control rods will be provided instead at the other side of a given assembly as seen by comparing the location of the rods in rows 52 and 53.

FIG. 3 is a sectional elevation of the fuel assembly 45 which consists of fuel elements or pins 46 contained in a box 55 of suitable metal or alloy normally used in the art for such applications, e.g. aluminum, magnesium, zirconium, etc. The box 55 is equipped with a lower end fitting 56 and an upper end fitting 57 each of which is secured to the box by screws 64. The lower end fitting 56 comprises a nozzle 58 for insertion into and rotating the fuel assembly in grid plate holes 42, a cruciform support 59 and a fuel element locating plate 60. The upper end fitting 57 includes a bail 61, a sleeve 62 and a cruciform hold down 63 and a fuel element locating plate 60. The bail 61 provides a means for moving the fuel assembly 45 under water with a suitably designed handling tool. The fuel element locating plates 60 maintain the spacing between fuel pins 46 and support the fuel pins. The fuel elements or pins 46 comprise fuel pellets 66 contained in tubes or cladding 68. One end of each pellet is preferably dished 67 to minimize movement of the pellet stack due to thermal expansion. The space between pellets 66 and tubes 68 is preferably filled with a suitable gas such as helium to provide good heat transfer between the uranium dioxide pellets 66 and tube 68. The tubes are sealed by end caps 69, which are sealed preferably by welding to each end of the tube. The end caps 69 are conveniently fitted with alignment elements such as square studs which mate with holes 75 in the fuel element locating plates 60 as described in connection with FIG. 6. Spacer warts 71 are affixed to the fuel element tubes 68 to prevent fuel element bowing during pulsing although various other structural means such as ferrules may be employed to effectuate the purposes. As shown in FIG. 4, the box 55 coupled with warts 71 serves to restrain the fuel pins 46 so that spacer warts 71 affixed to the tubes 68 touch each other and the box a relatively rigid integral network results. An interdependent support of this kind between fuel elements is important to provide optimum performance which suffers when the elements are bent from the effects of heat.

Interchangeability of the fuel elements is accomplished in the present invention by the structural configuration of elements and mountings. The center line of the end fitting or nozzle portion of the fuel assembly 45 used to position the assembly in the grid plate is eccentric with respect to the center line of the box. The end fitting also contains alignment holes which align with the locating pin in the grid plate. This arrangement makes it possible to mount the assembly in different orientations in the grid plate and eliminates the need for the special fuel assemblies used in plate type cores to house the control rods. Considerable flexibility in control rod location is achieved with this design.

The end view of the fuel assembly 45 containing the eccentric mounting arrangement is described by reference to FIG. 5 in conjunction with FIG. 3. The nozzle 58 of the lower end fitting 56 contains two alignment holes 74 which together with the locating pins 40 on the grid plate 41 enable the fuel assembly 45 to be arranged in two different orientations on the grid plate. This together with the fact that the center line 72 of the nozzle 58 is eccentric with the center line 73 of the box 55 makes it possible to provide a wide channel 47 between every other row of fuel assemblies as shown in the two upper rows 52 of fuel assemblies in FIG. 2. By rotating all fuel assemblies 180° to their alternate orientations, wide channels are provided in alternate rows as shown in the intermediate rows 53 of fuel assemblies in FIG. 2.

The fuel locating plate 60 as shown in FIG. 6 contains square holes 75 which receive and orient the fuel element end caps 69 and aid in maintaining the spacing of the fuel elements by preventing rotation. Upon correct positioning of the fuel elements, the spacers 71 will touch each other. The round holes 76 in the plate 60 are provided for the passage of the coolant through the fuel assembly. It will be apparent that the various details for orienting, locating and securing the assemblies is not intended as a limitation on the invention and does not preclude alternate means which one skilled in the art may employ to effectuate comparable results.

The control rod assembly 31 of flat blade type is illustrated in FIGS. 7–9 and comprises a guide 49 and a movable control rod 50. The control rod 50 is fastened to a shock absorber assembly 78 of the type conventionally employed for this purpose. The control rod guide 49 is equipped with locating pins 79 and 80 which are used to position the control rod assembly in grid plate holes 43. The center locating pin 79 contains a coolant passage hole in order to provide the flow of coolant past the control rod 50. FIG. 9 shows the relationship of the control rod guide 49, the control rod 50, and the locating pins 79 and 80 of control rod 31 in alternate detail. The locating pins 79 and 80 are designed to be wider than the guide 49 so that it is necessary to first remove fuel assemblies adjacent to the guide if it is desired to change the location of the control rod assembly 31 on the grid plate 41 as described in conjunction with FIG. 2.

The guide assembly functions to accurately position the control rod in the core and to shroud the rod. For this reason, the fuel assemblies need not be equipped with hold-down mechanisms. This is because the control rod cannot touch the fuel assembly as withdrawal of the control rods cannot inadvertently withdraw adjacent fuel assemblies. The control rod is actuated by a conventional rod magnet, which is contained in the guide tube fastened to the top of the control rod assembly. The absorber section of the control rod is constructed of a suitable material such as cadmium sheathed in aluminum, an alloy of silver-indium-cadmium, etc.

While the present invention has been described with reference to a number of specific details, it will be apparent that various modifications may be effected by those skilled in the art without departing from the contribution provided by the invention. Accordingly, it is contemplated that the invention encompass all modifications that fall within the purview of the appended claims.

What I claim is:

1. A fuel element system for generating high neutron flux comprising a plurality of metallic clad elongated fuel pins in combination, a metallic housing in which said pins are maintained in spaced fixed relationship, spacing means affixed to and intermittently spaced along the length of said fuel pins so as to be interposed between said fuel pins, said intermittently spaced means engaging the like spacing means on adjacent pins so that each fuel pin is laterally supported intermediate its length against each other pin and against said housing, said pin housing provided with an eccentric end fitting for interchangeably mounting an array of said pins in a grid plate to produce an active core and said eccentric fitting affording control rod channels between said elements.

2. In a system according to claim 1 wherein said spacing means for laterally supporting said pins against each other and said housing comprise warts.

References Cited

UNITED STATES PATENTS

| 2,831,806 | 4/1958 | Wigner | 176—94 |
|---|---|---|---|
| 2,985,574 | 5/1961 | Newson et al. | 176—36 |
| 3,142,627 | 7/1964 | Emerson | 176—78 |
| 3,169,097 | 2/1965 | Meyers | 176—79 |
| 3,182,003 | 5/1965 | Thorp et al. | 176—78 |
| 3,185,632 | 5/1965 | Bradley | 176—78 |
| 3,255,091 | 6/1966 | Frisch | 176—78 |

L. DEWAYNE RUTLEDGE, *Primary Examiner.*

CARL D. QUARFORTH, *Examiner.*

R. L. GRUDZIECKI, *Assistant Examiner.*